United States Patent [19]

Charvat

[11] Patent Number: 4,504,283
[45] Date of Patent: Mar. 12, 1985

[54] CUSHIONED ABRASIVE ARTICLES, AND METHOD OF MANUFACTURE

[75] Inventor: Vernon K. Charvat, Bay Village, Ohio

[73] Assignee: Superior Finishers, Incorporated, Valley View, Ohio

[21] Appl. No.: 431,103

[22] Filed: Sep. 30, 1982

Related U.S. Application Data

[63] Continuation-in-part of Ser. No. 399,592, Jul. 22, 1982.

[51] Int. Cl.³ .................................................. C08G 5/12
[52] U.S. Cl. ................................... 51/298; 51/109 R; 51/285
[58] Field of Search ......................................... 51/298

[56] References Cited

U.S. PATENT DOCUMENTS

| | | | |
|---|---|---|---|
| 2,885,276 | 5/1959 | Upton | 51/298 |
| 3,377,411 | 4/1968 | Charvat | 51/298 |
| 3,551,125 | 12/1970 | Hallewell | 51/298 |
| 3,605,349 | 9/1971 | Anthon | 51/402 |
| 3,631,638 | 1/1972 | Yoshikawa | 51/298 |
| 3,829,298 | 8/1974 | Ainoura | 51/298 |
| 3,840,357 | 10/1974 | Shimizu | 51/298 |
| 4,128,972 | 12/1978 | Charvat | 51/295 |

*Primary Examiner*—James Derrington
*Attorney, Agent, or Firm*—Maky, Renner, Otto & Boisselle

[57] ABSTRACT

Extremely fine abrasive particles are incorporated in an elastomeric resin body or coating to produce abrasive articles exhibiting cushioned or resilient yielding qualities having a dual response to in-service conditions. These performance characteristics are accomplished by a structure whose working surface and underlying supporting means produce two distinct and complementary abrading actions, one hard enough to sharpen a hardened cutting tool and to smooth the adjacent surface, and a second of being virtually simultaneously microdeformable, via the mechanisms of cold flow, at or near maximum or optimum sharpening pressure. Such abrasive articles allow limited local displacement of a volume of the abrasive surface layer in a continuous wave to lift the surface at the tool edge to a height slightly beyond the plane of the edge being sharpened to "wipe" and so refine the extreme edge of the cutting tool and to remove the "wire-edge" as only athree-dimensional form of contact will accomplish. The articles of this invention are particularly suited to the performance of honing, stropping and lapping operations.

24 Claims, 23 Drawing Figures

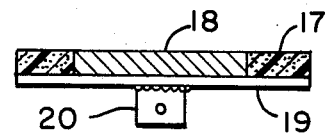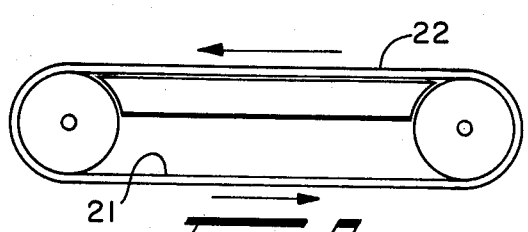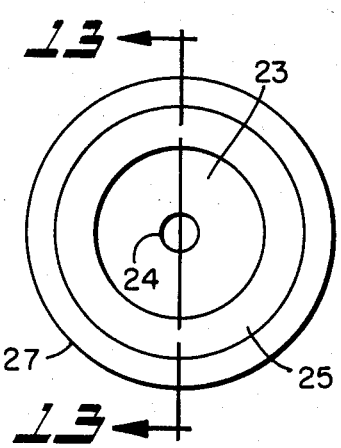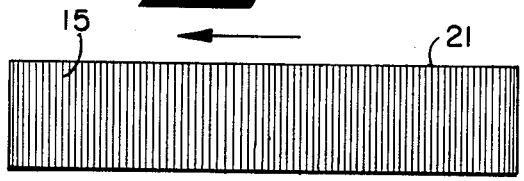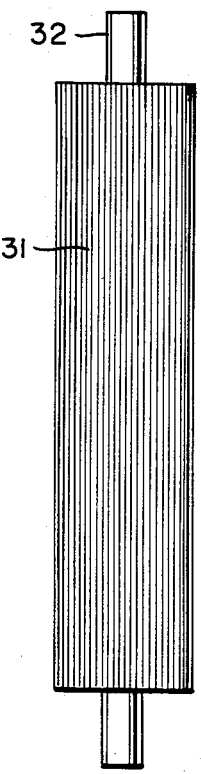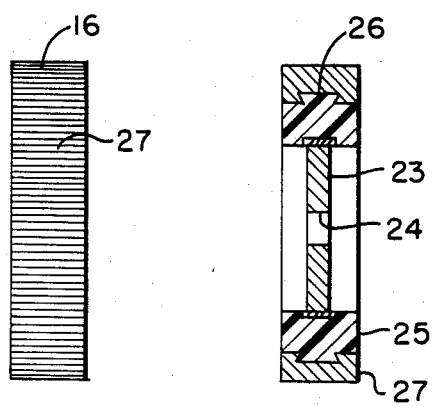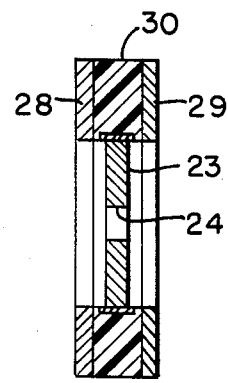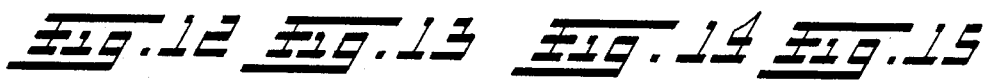

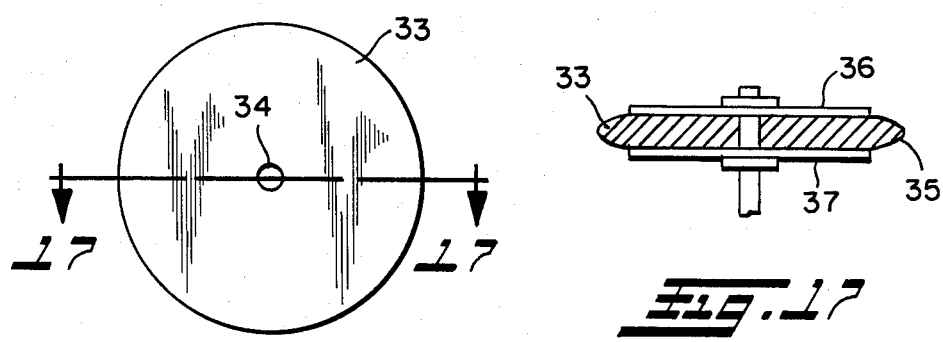
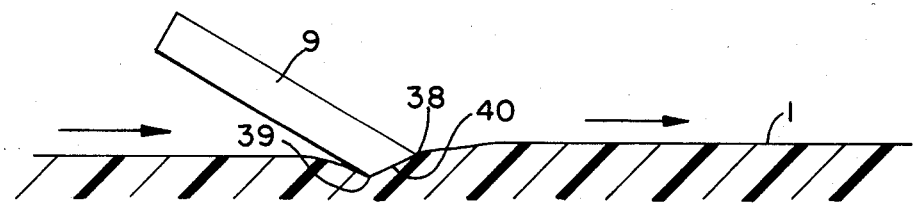
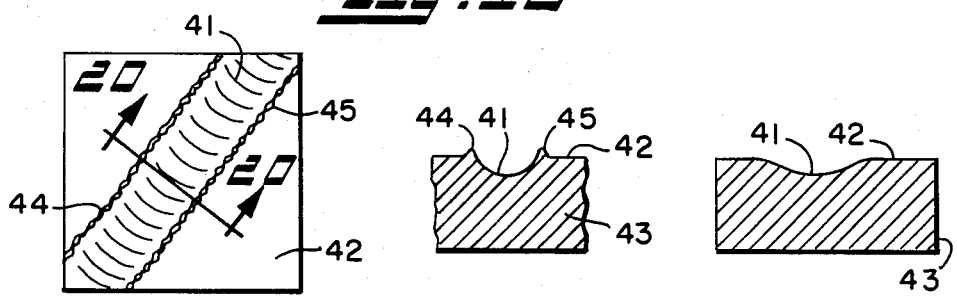
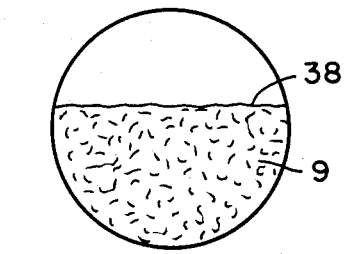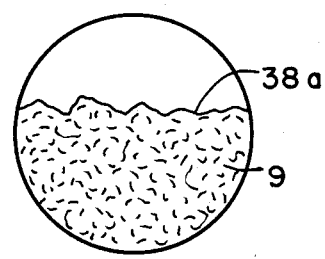

CUSHIONED ABRASIVE ARTICLES, AND METHOD OF MANUFACTURE

This is a continuation-in-part of Application Ser. No. 399,592, filed July 22, 1982 and entitled "Molded Products and Methods of Manufacture".

BACKGROUND OF THE INVENTION

Tools of great variety have been ground, honed and lapped for millenia past, and great effort has been expended in attempting to put the keenest possible edges on them. Certain metals, alloys, and treated steels have been developed which are capable of taking exceptionally sharp edges but practical limits have been encountered in producing and maintaining such sharpness.

From fixed blocks of smooth abrasive stones through rotated wheels, both vertical and horizontal, man has sought to create the ultimate edge by abrading and forming from a relatively blunt edge of metal a meeting of planar surfaces at various angles to form various tools. Chisels generally contain angles of from about 45°, and normally a mallet is used to drive the sharpened wedge into the workpiece. Other tools have been prepared having more and more acute angles to the development of razors whose planar surfaces meet at angles of about 20°. Intermediately, tools having a variety of cutting edges sharpened for graving, carving, shearing and slicing, and generally hand-operated tools having a single sharpened edge, including knives and chisels, to cutting devices having mating blade elements acting together to produce shear through compressive forces have been developed and have become standard types of cutting tools.

While excellent edges on cutting tools have been obtainable, the observant user has recognized that the original edge on the newly-made cutting tool was not perfect in its creation, and that upon use better results with greater control of detail are obtained when the professed sharp tool is subjected to honing, stropping, fretting, whetting, burnishing, polishing, buffing, abrading and grinding, which are intended to create and maintain "an ultimate edge" on the cutting surface of a specific cutting tool, be it a razor, knife, chisel or graving tool. The expression "refining an edge" evolved to describe the process for obtaining and maintaining the "ultimate edge" of the cutting tool and particularly for such tools as are adapted to the highest order of skill in their ultimate use, such as for use in creating works of art and for surgical procedures.

One common type of sharpening device includes hand grinders characterized by a vertical ceramic abrasive wheel of relatively narrow width to diameter powered by a hand crank, most often operating through a gear train where one revolution of the crank produces perhaps 10 to 20 revolutions of the vertical wheel, sometimes cooled by water dropping on the surface, or the wheel moving through a water bath.

An obvious development to avoid the distraction of doing two things at once is applying a power source to replace the crank. Here, cooling, may be altered by a variety of means, mostly dependent upon water continuously extracting heat from the workpiece-wheel surface contact area. In both modifications, the abrasive surface rotates at a high rate of speed and at best their suitability is in original formation of an edge which is to be refined by means of a second process.

Power-operated devices also are available generally having a coarse grinding wheel (less than 100 grit) operating at about 3600 rpm. and a slow speed fine grit water-cooled wheel whose rpm. is substantially reduced in shear rate with the workpiece. The latter, however, is still too fast to permit "feel" in the hands of the craftsman-operator essential to a consistent approach to "refining an edge".

A present-day approach to the problem of obtaining precision sharpening are the motorized waterstones originating from Japan. In these sharpening units, there are a plurality of doughnut-like flat surface abrasive stones demountably attached in a motorized frame rotated at about 500 rpm with a working surface displaced radially outwardly from a vertical driving shaft. The abrasive surfaces allow release of the fine grit into the water which continuously flows from the stone supporting center outwardly over the motor driven grinding area. A flat planar grind is significantly less scarified by the abrasive action and the skill required demands some experience on the part of the operator. Ancillary supporting elements are often used in the combination.

In all of the above sharpening devices there is aggressive use of the metal and initial costs of the bench equipment are relatively greater than would appear required in view of the advances herein disclosed and claimed.

When examined under high magnification, even apparently very sharp tool edges are observed in actuality to be quite irregular and serrated. Also, a very common problem encountered in attempting to produce ultra sharp edges is the production of the well-known "wire edge", where a thin elongated strip of metal adheres to the sharpened edge. In conventional practice, such "wire edge" is simply scraped away or the blade is resharpened at a less acute angle; in either event, the resultant edge is appreciably less sharp than the ideal. Consequently, many manufacturing operations employing cutting tools are less efficient than they otherwise might be, and even certain manual operations such as wood carving are rendered more difficult and frustrating.

There is also an increasing demand for the production of exceptionally flat and smooth micro surfaces and the shaping of articles to ultra precise dimensions, as in the lapping of quartz wafers in the production of frequency control devices and the lapping of single crystal silicon wafers in the production of micro circuits. It is important to reduce production costs and the percentage of rejects in these areas.

Abrasive polishing tools (wheels) have been described in the art which are flexible and deform under modest pressure. Polishing wheels generally are used on a surface which already has been brought to a specification dimension since polishing wheels are not intended to remove stock. One type of abrasive polishing wheel exhibiting the desired flexibility and deformity under mild pressures is described in U.S. Pat. No. 4,128,972. Such wheels have a "Shore A" hardness of less than 96 and comprise an abrasive grain, an elastomer bond, an inert filler and less than 10 percent by volume of voids. The relative volume amount of grain, elastomer and filler are critical to the properties and performance of the polishing wheels. Although such wheels as described in U.S. Pat. No. 4,128,972 perform as well as polishing tools, they are too soft to perform satisfactory as in honing, stropping and lapping operations.

SUMMARY OF THE INVENTION

Cushioned or slightly resiliently yielding abrasive articles are described which comprise a quantity of fine discrete abrasive particles bonded together in an elastomeric resin binder, such particles being sufficiently densely concentrated in the binder. The abrasive article generally is characterized as having a Shore D Hardness of from about 70 to 100 at its working face with a cold flow characteristic (creep) which amounts to a drop of from five to fifteen points (preferably five to ten) in five to ten seconds from the maximum reading. Methods for producing such cushioned or slightly resiliently yielding abrasive articles are described which comprise mixing a quantity of fine discrete abrasive particles with a supply of liquid resin binder material, placing such mixture in a mold designed to form an abrasive article of the desired type and shape, and curing such binder material to produce a composite binder-abrasive article having the desired Shore D Hardness at the working face with the cold flow properties of the range given. The articles of this invention are particularly suited to the performance of honing, stropping and lapping operations. Thus the articles of the invention have been and are referred to in this application as "STRONE TM". In particular, the abrasive articles of the invention can be utilized to effect a sharper and more perfect edge on a wide variety of cutting tools as well as an exceptionally smooth surface immediately behind such edge.

BRIEF DESCRIPTION OF THE DRAWINGS

In the annexed drawings:

FIG. 8 is a vertical transverse section taken along line 8—8 of FIG. 7, the backing plate and hub being shown unsectioned;

FIG. 9 is a semi-diagrammatic side view of an endless abrasive belt in accordance with the invention, and associated drive means;

FIG. 10 is a top view of such belt;

FIG. 11 is a side face view of a rotary wheel in accordance with the invention;

FIG. 12 is an elevational view of the working face of such latter wheel;

FIG. 13 is a transverse section taken along line 13—13 of FIG. 11;

FIG. 14 is a sectional view similar to that of FIG. 13 but illustrating an embodiment of the invention where the hone elements are mounted on the side faces of the wheel rather than on the outer periphery thereof;

FIG. 15 illustrates a rotary hone generally to that of FIGS. 11-13, but in the form of an elongated roller;

FIG. 16 is a side face view of another form of wheel in accordance with the invention;

FIG. 17 is a transverse section taken along line 17—17 of FIG. 16, showing associated face plates and mounting means;

FIG. 18 is a diagrammatic view illustrating in a general way the manner in which a tool to be sharpened may engage the working surface of the hone;

FIG. 19 is an illustration based upon a micro photograph showing a minute furrow made in the surface of a metal workpiece by an abrasive grain;

FIG. 20 is a transverse section taken along line 20—20 of FIG. 19;

FIG. 21 is a view corresponding to FIG. 20 illustrating the effect of the hone of this invention on such workpiece;

FIG. 22 is a semi-diagrammatic illustration from a micro photograph of the cutting edge of a tool sharpened with the hone of the invention; and FIG. 23 is a corresponding illustration of the cutting edge of such tool as sharpened with a premium prior art hone.

DESCRIPTION OF THE PREFERRED EMBODIMENTS

Figure 1:
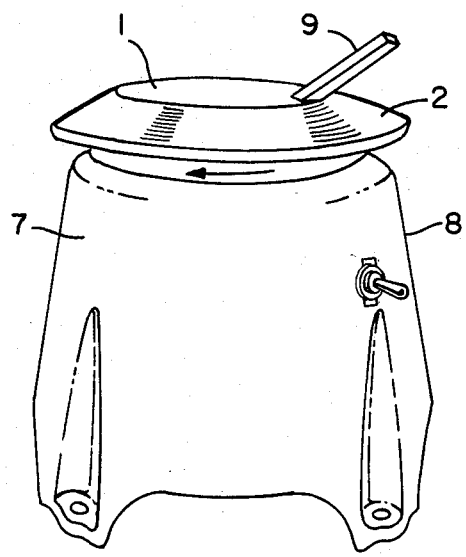
FIG. 1 is an isometric elevation of a vertical spindle machine having one form of the rotatable hone (i.e., STRONE TM) of this invention mounted thereon.
Figure 2:
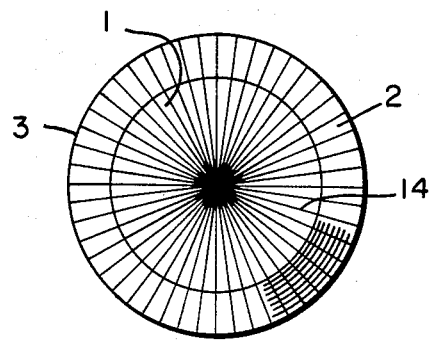
FIG. 2 is a top view of such hone.
Figure 3:
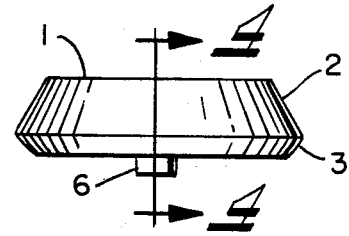
FIG. 3 is a side view of such hone.

Extremely fine abrasive particles are incorporated in an elastomeric resin body or coating to produce abrasive articles exhibiting cushioned or resilient yielding qualities having a dual response to in-service conditions. These performance characteristics are accomplished by a structure whose working surface and underlying supporting means produces two distinct and complementary abrading actions, one hard enough to sharpen a hardened cutting tool and to smooth the adjacent surface and a second of being virtually simultaneously micro-deformable, via the mechanism of cold flow, at or near maximum or optimum sharpening pressure to allow limited local displacement of a volume of the abrasive surface layer in a continuous wave to lift the surface at the tool edge to a height slightly beyond the plane of the edge being sharpened to "wipe" and so refine the extreme edge of the cutting tool and to remove the "wire-edge" as only a three dimensional form of contact will accomplish. Thus the working layer of the abrasive tool first provides the necessary flat condition needed for regular sharpening action but subsequently is deformable under additional pressure of the tool being sharpened to further refine the extreme portion of the cutting edge. Upon release from the extra increment of pressure, the original flat surface is reestablished. The wave displacement of the surface amounts to less than approximately 0.025 inch.

The working face should be free of all irregular markings especially concentric ones or ones which may generate, via rotation, into a concentric effect. A few random and single bubbles, while they should be desirably avoided, do not, in fact, materially adversely influence the results. However, cellular structure is not satisfactory, and a uniform working layer of abrasive bond without visual discontinuities such as clusters of cells or voids is to be the objective.

As mentioned above, the abrasive articles of the present invention are particularly suited to the performance of honing, stropping and lapping operations. Accordingly, I refer to these new abrasive articles as STRONES TM.

The quality of deforming (to accomplish the ultra sharpening) is fundamental to the results obtained with the STRONE. The particular physical properties which produce this result are as follows:

(1) Deformation will vary depending on the particular use intended for the stone. For very small articles such as hypodermic needles, deformation is preferably limited to about 0.002 to 0.003 inch under normal sharpening pressures and more generally to about 0.0025 inch. For wood carving chisels, the normal range is approximately 0.005 inch to 0.015 inch. For cutting tools, the deformation extent could properly reach up to 0.020 to 0.025 inch.

(2) The pressure required to obtain the desired strone deformation is in the range of from about five pounds per square inch to 25 pounds per square inch. Wood carvers tools, for example, normally require 15 to 20 pounds per square inch. Here again, very small articles would usually require pressures at the low end of the range of five to 25 pounds per square inch.

The performance and success of the STRONE depends on a limited amount of deformation (too much is an easy mistake to make as this would destroy an edge for the reason of too much wrap around the edge) at a pressure range which produces sharpening and surface finishing with a high abrasive content that works quickly and efficiently without a build-up of heat which condition causes metallurgical damage.

Referring now more particularly to the drawing, and especially to FIGS. 1–6 thereof, one particular preferred embodiment of the invention comprises a generally disc-shaped body of elastomeric resin having a quantity of fine discrete abrasive particles densely concentrated therein. Such body may have a flat circular upper surface 1 approximately six inches in diameter surrounded by a downwardly sloping or beveled rim portion 2 about one and one-half inch radius for a purpose explained below.

Figure 4:
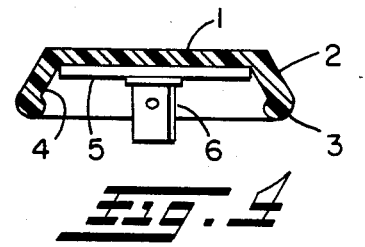
FIG. 4 is a vertical transverse section taken along line 4—4 of FIG. 3.

As best shown in FIG. 4, the underside 4 of the resin-abrasive body is desirably dished both to reduce the amount of materials employed and also to provide for such rounded lip portion 3. Such body may be approximately one inch in thickness and may be supported by circular metal backing plate 5 cemented thereto and provided with a central hub 6 for mounting upon a vertical drive spindle (not shown) of an electric driving mechanism including a speed reduction unit effective to rotate such hone at slow speeds on the order of 65 to 85 rpm., and more particularly at 70 rpm., for example. Such drive mechanism is enclosed with housing 7 and may be controlled by manual on-off switch 8.

The flat upper surface 1 may be used to sharpen such tools as knives, chisels and the like having straight edges; beveled surface 2 may be used when somewhat greater honing speed is desired; and the rounded lip 3 may be employed for sharpening tools having curved edges such as gouges. As will be understood, the surface speed of the hone declines as one approaches the center of rotation. While suitable for sharpening and polishing a wide range of tools and other articles, sets of wood carvers' tools are illustrative of those benefited by employment of this hone.

The term "hone" as used herein is not intended to be limited to the particular types of abrasive tools or instruments previously known by such name since, as will be seen, the new abrasive article of the invention has certain novel characteristics which also render it useful for operations more commonly described as lapping or polishing. The composition of such new abrasive articles will now be more particularly described.

The abrasive articles comprise an elastomeric resin bonding material such as certain selected epoxy resins and polyurethanes together with a large proportion of very fine discrete abrasive particles to produce a body having a Shore Hardness on the D Scale of from 70 to 100, and preferably from 80 to 90. For sharpening many types of steel tools, a Shore D Hardness of 88 is excellent. To achieve the desired degree of hardness, which still affords a limited resiliently yielding or cushioning action, as measured by the difference between the original high "Shore" reading taken within one second and the reading taken after five to ten seconds, I employ a binder resin, which, when cured, would normally have considerably greater elastomeric yielding action, the incorporation of the abrasive serving to increase the overall hardness of the resultant body to the level indicated. Consequently, an operator may manually press a tool 9 (FIG. 1) against the rotary hone surface only slightly resiliently to depress the latter in a transiently local area as such surface travels therepast.

The durometer reading is taken within one second after firm contact between its flat bottom and the test specimen has been established. However after attaining an initial reading, the dial hand gradually recedes on specimens exhibiting cold flow or creep characteristics. In such cases, both the initial reading, or maximum reading, is recorded as well as the reading after a specified time interval; say, five to ten seconds. The difference between the two readings is proportionate to the cold flow or creep property of the article. Shore Hardness testers are available which take both readings.

THE ELASTOMERIC RESIN BONDING MATERIAL

The term elastomeric resin bonding material as used in this specification and in the claims includes liquid organic adhesive materials which, when mixed together with the fine discrete abrasive materials in predetermined proportions will convert, after reasonable times, to form a solid coherent mass characterized as having a slightly resiliently yielding surface. More particularly, the solid coherent mass which is obtained should have a Shore Hardness on the D Scale of from 70 to 100, and preferably from 80 to 90. Accordingly, not all of the previously known elastomeric bond materials can be used in conjunction with the fine discrete abrasives in accordance with this invention.

The chemical nature of the adhesive elastomer bond material is important only insofar as it relates to the physical qualities of the final product. The presence of foam or voids caused by foam during the preparation of the abrasive articles of the invention is undesired. Although it is known that gas cells and voids assist in cooling abrasive wheels through better heat transfer, voids in the abrasive articles of the invention lessen the physical integrity of the articles, and allow low pressure distortion and uncontrolled ballooning, and the cohesive forces folding the fine discrete abrasive grains in the article and together are materially weakened.

Preferred classes of adhesive elastomeric bonding material employed in the present invention include polyurethane and epoxy resins, and mixtures thereof.

Many of the polyurethane resins available commercially comprise two-package liquids which are co-blended just before use, and have a pot life of up to several hours before converting liquids to solids at usual ambient temperatures. It is well known that polyurethane polymer precursors tend to foam in the presence of any moisture. Therefore, precautions are to be exercized that no moisture is introduced into the liquid polyurethane precursor components either before or after intermixing with the discrete abrasive particles and just prior to filling of the mold cavities to produce the abrasive articles of the invention. Additionally, all mixing of components must be carried out with great care so that agitation in itself does not introduce air or other gas or moisture which will form pockets or gas voids or cells in the admixture. The prior art contains many descriptions of the chemistry of polyurethane precursor components, but in general, it is known to use from about 0.9 to in excess of 1.5 equivalents of selected diisocyanates with one equivalent of a dihydroxy terminated polyester or polyether whose molecular weight is above about 400 to 4000. It is common to use stoichiometric excesses of the diisocyanate component to produce required curing. Other catalysts are known including organic peroxides. Plasticizers, including octylalcohol terminated polypropylene adipates of 2000 to 5000 molecular weight and in amounts from about 2 to about 20% have been used in some instances to soften polyurethanes and may be used in some instances with advantage. Smaller quantities of epoxies such as monomeric diglycidyl ether of Bisphenol (A) also have been incorporated in polyurethanes to increase their temperature resistance.

Polyurethane elastomers useful in this invention are available commercially. One group of such elastomers is available from REN Plastics, Lansing, Mich. under the general trade designation "REN=C=O—THANE". Specific examples include RP 6402 having a Shore A Hardness (unfilled) of 75–80, RP 6403 having an unfilled Shore A Hardness of 85–90 and RP 6422 having an unfilled Shore A Hardness of 75–80.

The epoxy resins which can be utilized in the present invention include many of the well-known resins characterized by the presence therein of an epoxide group. Such resins have either a mixed aliphatic aromatic or an exclusively non-benzenoate (i.e., aliphatic or cycloaliphatic) molecular structure. The mixed aliphatic-aromatic epoxy resins generally are prepared by the well-known reaction of a bis-(hydroxy-aromatic)alkane or a tetrakis-(hydroxy aromatic)alkane with a halogen substituted aliphatic epoxide in the presence of a base such as, for example, sodium hydroxide or potassium hydroxide. Examples of the halogen-substituted aliphatic epoxides include epichlorohydrin, 4-chloro-1,2-epoxy butane, 5-bromo-1,2-epoxy pentane, etc. In general, it is preferred to use a chlorine-substituted terminal alkaline oxide (terminal denoting that the epoxide group is on the end of the alkyl chain).

Epoxy resins of the type which can be utilized in the invention are available from a wide variety of commercial sources. One group is known under the general trade designation "Epon" resins, which are available from Shell Chemical Company. For example, "Epon 820" is an epoxy resin having an average molecular weight of about 380 and is prepared from 2,2-bis-(p-hydroxy phenyl)propane and epichlorohydrin.

For the purposes of this invention, the liquid forms of epoxy resins are preferred. These liquid forms normally comprise very viscous liquids requiring some degree of heating to permit withdrawal from storage containers. Certain "D.E.R." resins obtainable from Dow Chemical Company, and "Epotuf" liquid epoxy resins obtained from Reichhold Chemicals Inc. are examples of such resins preferred for employment in accordance with the invention. Particularly preferred "Epotuf" liquid epoxy resin is the undiluted medium-high viscosity No. 37-140 having an epoxide equivalent weight of 180–195, a viscosity (ASTM D-445) of 11,000–14,000 cps at 25° C., and a Gardner Color Maximum of 3. This is a standard general purpose epoxy resin. The "Epotuf" resins generally are considered to be of the aromatic type whereas the "D.E.R." epoxy resins are considered to be of the linear type.

A variety of hardeners or catalysts for accelerating the polymerization and cross-linking reaction are known for epoxy resins. Examples include polyfunctional aromatic amines, polyamides and organic acid anhydrides. The polyamine hardeners may be aliphatic polyamines such as "Epotuf 37-614" or aromatic polyamines. An example of an anhydride hardener is "Epotuf 37-624" whereas examples of commercially available polyamide hardeners include "Epotuf 37-600", "37-612" and "37-640". The catalysts selected for a particular elastomeric resin will depend upon a number of factors including the desirable pot life and properties of the cured resin.

Curing agents and hardeners also are utilized when the elastomer resin bonding material is a urethane. Examples of curing agents include polyamines such as 4,4′methylene bis(orthochloroanaline), generally referred to as MOCA, methylene dianiline(MDA),m-phenyline diamine, etc. A number of proprietary hardeners are available commercially for use with commercially available polyurethanes. For example, hardener RP-6402 is available from REN Plastics of Lansing, Mich. for use with their polyurethane identified as RP-6402.

ABRASIVE PARTICLES

The abrasive particles useful in the preparation of the articles of this invention are those abrasives generally known in the prior art which are available in extremely fine particle sizes such as 600–700 mesh or finer.

The following types of abrasive particles, when available in such fine particle sizes, can be utilized in the present invention: fused alumina, sintered alumina, aluminum oxide "flour", iron oxide, feldspar, quartz, olivine, silicone carbide, emery, garnet, pumice, sand, etc. An example of an extremely fine particle is sericite (approximately 3.5 microns in diameter).

The amount of fine discrete abrasive particles included in the abrasive articles of the invention should be sufficient to provide a high density of abrasive particles. Generally, the amount of abrasive particles included in the articles of the invention will be an amount which is equal to or greater than the bulk or pack density of the particulate materials. The term "bulk" or "pack" density of abrasive grains is well known and understood in the art. The bulk density of abrasive articles (grams/unit volume) is obtained by free fall or equivalent procedure. The bulk density of various grains is available from the producers thereof as an average, or it can be determined easily for any specific batch by experimentation. Examples of usable weight ratios of particle to bond, dependent on the specific weights of the particles are as follows. For sericite having a specific gravity of about 2.6 and the bond having a specific gravity of about 1.08, the weight ratio should be about 1:1. In the case of silicon carbide 700F, the weight ratio of abrasive to bond should be about 2:1.

In the present invention, the abrasive content of the cushioned abrasive articles may be substantially in excess of 100% of the bulk or pack density of the particular abrasive employed. In some instances, it may be desirable to utilize several different abrasive materials and/or several different mesh sizes blended together.

As mentioned above, the grain density should be sufficient to provide the desired abrasive qualities to the articles of the invention, but should not be so great, when combined with the elastomer resin bonding material to form an abrasive article which is too rigid. The articles of the present invention are designed to exhibit slightly resiliently yielding surfaces which generally are characterized as having a Shore D Hardness of from 70 to 100 at the working face of said article, while also having the cold flow characteristics that give a five to fifteen point lower reading in five to ten seconds.

Although generally not required, the inclusion of various discrete inert filler materials in the abrasive articles of the invention may be desired in certain instances. Examples of inert filler materials include mica, graphite powder, iron pyrites, quartz, titanium dioxide, cryolite, felts gypsum, clay, etc. When incorporating the inert filler and abrasive particles into the resin, it is necessary to blend the solid particles with the liquid resin in a manner which will not result in entrainment of air into the mixture.

METHOD OF MANUFACTURE

Figure 5:
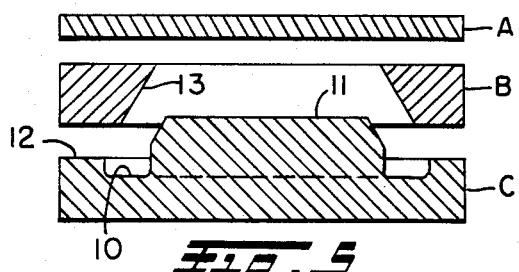
FIG. 5 is a vertical transverse section through a three-part mold for producing such hone, taken along line 5—5 of FIG. 6.

The manufacture of one embodiment of the new articles (hones) will be described initially with reference to FIGS. 4–6 of the drawing.

Figure 6:
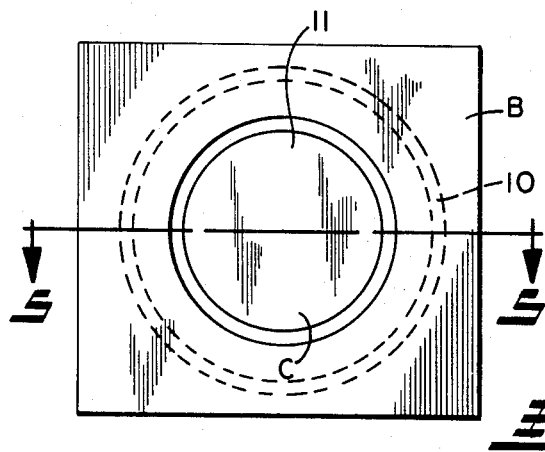
FIG. 6 is a top plan view of such mold with the cover plate removed.

A tri-partite mold is employed as shown in FIG. 6 which comprises a flat cover plate A, a central mold section B, and a bottom mold section C, all of the same outer lateral dimensions. Such bottom section C has an annular groove 10 therein adapted to form the rounded lip portion 3 of the STRONE, with an elevated central circular table 11 extending upwardly above the mold parting line 12 to define the underside of the hone. Mold section B has a central circular opening 13 sloping downwardly outwardly to define beveled rim portion 2 of the STRONE in conjunction with the side wall of central table 11 of the mold. Sections B and C are clamped together during filling and all three mold sections are adapted to be clamped tightly together to close and seal the mold cavity after the latter has been filled. The usual wax type parting composition may be employed.

While the STRONE thus to be produced may be of various dimensions, I have found a particularly practical and suitable size to be one where the flat top surface 1 is about six inches in diameter and the beveled rim portion 2 is about one and one-half inches wide, with the radial thickness of such downwardly depending rim or flange being about three-sixteenth of an inch.

Preferred procedures utilizing such mold are as follows.

EXAMPLE 1

Polyurethane RP-6402 (77 grams) is mixed with 220 grams of hardener RT-6402, (both available from REN Plastics) and 290 grams of sericite "SER-X" #200 are then slowly added thereto with careful mixing to avoid unnecessary entrainment of air into the mixture. After five minutes of mixing to ensure very complete and uniform incorporation of such abrasive in the liquid resin, the resultant mixture is slowly poured into the mold comprising parts B and C clamped together. During such pouring operation this mold assembly is rotated about its axis at from about 70 to about 100 rpm. to aid in evenly distributing the material until the annular groove has been filled up to the level of mold table 11. The axis of rotation may desirably be slightly tilted about 5° to about 10° to assist in the escape of air bubbles from beneath surface 13 at the lower (downhill) side of the mold.

The remainder of the mixture is now poured into the mold centrally of table 11 so that the material flows in a generally radially outwardly direction until the mold has been filled. This likewise tends to reduce the occurrence of bubbles in the radially outer areas (which are the areas of the finished article later utilized in performing a honing operation). Immediately upon filling the mold, which may desirably be very slightly over-filled with the viscous mixture, the exposed upper surface of the mixture is swept in a radially inward direction with a fine bristle brush or preferably a small flexible flap of Teflon fabric to break up any surface air bubbles. The mold may conveniently be rotated very slowly by hand during this operation, the inclined axis of rotation further assisting in escape of bubbles from the lower side of the mold. Such brushing action also serves to mound up the slight excess of the mixture at the center of the exposed surface, the brushing requiring only a minute or two.

Immediately thereafter, the flat mold top A is clamped in place and the entire mold assembly at once inverted, with the result that any remaining bubbles migrate upwardly to what will become the lower non-working surface of the hone. Also, the abrasive particles cannot now settle away from what will become the working face. The slight excess of material ensures that the latter is firmly pressed in the mold to inhibit further bubble formation.

After a preliminary room temperature cure of about one hour, the mold assembly is placed in its still inverted position into an oven where the cure continues at between 65°–95° C. for another four hours. The molded article may now be removed from the mold with care, since the cure continues gradually for several more days.

The polyurethane RP-6402 above specified is a liquid polyurethane resin having a Brookfield viscosity of 50 cps at 25° C. It is available from REN Plastics of Lansing, Mich. The hardener RP-6402 is furnished as a system by the same company. The "Ser-X" #200 is a naturally occurring hydrous alumina silicate having a typical chemical analysis (on a calcined basis) of 70.40% $SiO_2$; 17.11% of $Al_2O_3$; 4.40% of $K_2O$; 3.72% $Fe_2O_3$; 2.85% MgO; 1.01% $Na_2O$. It is available from Gross Minerals Corporation of Aspers, Pa. It has a hardness of 4.00–4.50 on Moh's Scale, and an average particle size of 3.66 microns. For many purposes, such particles of 4 microns or less, in diameter are preferred. An advantage of sericite as an abrasive is its availability with very low moisture content, especially when employed in a polyurethane bond.

The above-described polyurethane-curative mixture, if no further additive is employed, will cure to a Shore A Hardness of from 75 to 80. However, the fully cured hone of this example, due to the incorporation of the abrasive sericite particles, has a consequent hardness of approximately 88 on the Shore D Scale with a cold flow or creep property of reading of about 78 on the Shore D scale after five to ten seconds. Similarly, the cured polyurethane resin per se has an elongation of 320%, but when modified by the incorporation of the abrasive, the hone affords only a slight resilient cushioning effect when a tool is firmly but lightly engaged against its surface.

EXAMPLE 2

A superior hone according to the invention also may be produced employing a modified epoxy binder material. Such binder may be constituted of:

60 grams "Epotuf" 37-140 epoxy resin (aromatic)
65 grams "D.E.R." 736 epoxy resin (linear)
42 grams "Epotuf" 37-63 hardener
167 grams, total bond The 60 grams of "Epotuf" 37-140 are preheated to about 95° C. and the 65 grams "D.E.R." 736 and the 42 grams "Epotuf" 37-63 at room temperature are mixed therewith, care being taken not to beat or otherwise draw air into the mixture. 350 grams of 700F silicon carbide abrasive are preheated to 95° C. and slowly incorporated into the highly liquid resin mixture with stirring. The mold may also desirably be preheated to 95° C. The procedure is otherwise as described in Example 1, except that the cure may desirably be at about 95° C. for one to three hours.

The "Epotuf" 37-140 epoxy resin is an epoxy having an epoxide equivalent weight of 180-195 and a viscosity (Brookfield) in cps at 25° C. of 11,000-14,000. It is available from Reichhold Chemicals Inc. of White Plains, N.Y. The "D.E.R." 736 epoxy resin has a viscosity range (cps at 25° C.) of 30-60, a specific heat at 25° C. of 0.4, and a specific gravity at 25° C. of 1.14. It is produced by Dow Chemical Company. The hone produced with these materials in this example has a Shore Hardness of 88-90 on Scale D.

Further typical formulations are set forth below, adapted to be processed in the manner as described in Example 2.

EXAMPLE 3

100 grams epoxy resin (aromatic)
60 grams epoxy resin (linear)
126 grams hardener
240 grams sericite The resultant hone has a Shore D Hardness of 95 with a cold flow reading of about 85 after five to ten seconds

EXAMPLE 4

86.5 grams epoxy resin (aromatic)
60.6 grams epoxy resin (linear)
60.6 grams hardener
210.0 grams sericite The resultant hone has a Shore D Hardness of 85 with a cold flow reading of about 75 after five to ten seconds

EXAMPLE 5

100 grams epoxy resin (aromatic)
70 Grams epoxy resin (linear)
119 grams hardener
289 grams titanium dioxide (700 mesh)

The resultant hone has a Shore D Hardness of 95 with a cold flow reading of about 85 after five to ten seconds

EXAMPLE 6

75 grams epoxy resin (aromatic
30 grams epoxy resin (linear)
72.5 grams hardener
350 grams silicon carbide (700 mesh)

The resultant hone has a Shore D Hardness of 90 with a cold flow reading of about 80 after five to ten seconds In each of the Examples 3-6, the aromatic resin is Epotuf 37-140, the linear resin is D.E.R. 736, and the hardener is Epotuf 37-63, as described above. The sericite is Ser-X #200.

The density of the new abrasive article employing sericite may range from about 1.40 grams per cubic centimeter to about 1.60 grams per cubic centimeter, with the preferred range being from 1.42 to 1.50 grams per cubic centimeter.

On a volume basis, the sericite may comprise from about 27% to 30% of the hone body, with 28% to 29% preferred. While such hone may, on occasion, contain as much as 7% by volume of air (or voids), it is desirable that the air or voids constitute no more than 4% and preferably as little as 2.5% or less.

As noted above, it is preferred that the abrasive content be at least equal to the bulk or pack density thereof, and it may even be somewhat more in the operative regions if the mold is vibrated further to concentrate and consolidate the abrasive particles in the still-liquid binder. Nevertheless, a good quality hone for many purposes can be made utilizing abrasive at only 85% of the bulk density, for example.

It will be understood that various other forms and shapes of hones may be produced in a manner generally similar to that described in detail above, but since most will be of a more simple configuration, no tilting of the molds would be required, and in some cases the rotation thereof, may be dispensed with. Various supporting elements, hubs, and the like may also be incorporated in such molds in well known manner for inclusion in the finished article.

It has been found to be a very desirable precaution to ensure that there are not local minute irregularities or protuberances on the hone surface which will travel in a direction more or less normal to a tool edge to be sharpened, since such may cause minute discontinuities, flaws or other defects in the sharpened edge. The careful elimination of bubbles at the working surface of the tool as above described much reduces this problem. This, of course, means that avoidance of moisture is important, particularly when polyurethane is the bonding medium, and further sets the new abrasive articles apart from the various prior art foamed polishing wheels. Nevertheless, the presence of a few very small voids may be permissable in certain operations, particularly if they are not disposed in a manner to cause repeated contact with the exact same portion of the tool edge being sharpened. The bond should wet the abrasive particles and substantially completely fill the interstices therebetween.

Alternatively, entirely random irregularities or elongated irregularities extending in a direction generally parallel to such tool edge (and therefore transverse to the direction of travel of the hone surface) tend to preclude such damage and even enhance the wiping action of such surface against the underside of the tool edge. For this reason, a multitude of closely spaced minute striations may be provided forming parallel grooves and ridges 14 extending generally radially of the rotary hone surface (FIG. 2), preferably within about 20° of radial. Similar striations 15 (FIG. 10) and 16 (FIG. 12)

may be provided transversely of the directions of travel of the working surfaces of other embodiments of the hone. Such effect may be achieved by dressing the hone surface with an abrading tool such as an abrasive belt employing grit selected to produce markings having a depth of less than 0.010 inch and preferably on the order of about 0.005 inch. Other markings such as a series of swirl patterns or a fine frosted effect may be utilized if arranged so that the effect on the edge of the tool to be sharpened is random and in no way reinforced by repetitive action on such edge (as would be the case of markings concentric to hone surface 1). These striations or markings may alternatively be formed in the appropriate mold surface to reproduce them in the hone.

Figure 7:
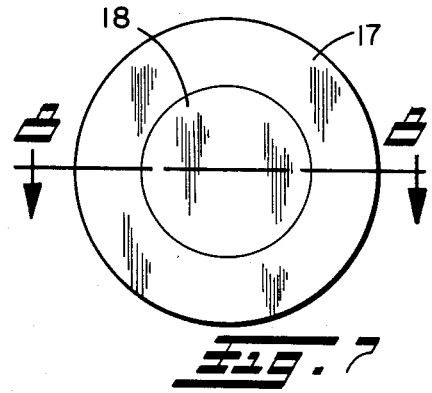
FIG. 7 is a top view of a combination rotary whetstone and hone in accordance with the invention.

FIGS. 7 and 8 illustrate a compound rotary abrading and finishing tool where the radially outer annular portion 17 may comprise a fine grade of whetstone (e.g., 700 mesh abrasive grit in an epoxy resin binder) and the inner circular area 18 may comprise the new abrasive body of the invention. These may be cemented to a circular backing plate 19 provided with a hub 20 for mounting on the vertical spindle of the FIG. 1 or other drive mechanism. The operator may thus first sharpen a tool on the relatively rapidly moving surface of whetstone 17 and then shift such tool to the more slowly moving surface of the disc hone 18 for production of the ultimate edge. It will be appreciated that additional radially outer annuli of progressively coarser grit size may be provided in addition to annulus 17.

In addition to the above described disc types of hones, a large number of other forms may be provided for various purposes. Thus, as shown in FIGS. 9 and 10, an endless abrasive belt 21 may have a thin coating 22 on the order of ⅛-inch thick of the resin-abrasive mixture bonded thereto and cured thereon in well-known manner, with such minute striations 15 extending in a direction transversely thereof. In the case of exceptionally large belts that will be trained around relatively large diameter drive rollers, the layer of hone composition may be as much as ¾-inch in thickness in view of the elastomeric properties thereof.

Also, as illustrated in FIGS. 11-13, the new hone of the invention may be provided in the form of a wheel having a central steel disc hub 23 with arbor hole 24. A rigid epoxy annulus 25 is cast thereon which may optionally have a peripheral key portion 26 to aid in securing a layer of the new hone composition 27 in the form of an outer peripheral rim bonded thereto. Such layer 27 may ordinarily be from six to twelve inches in width, although special forms from one-half to one inch to width are also useful, and from one-fourth to one inch in thickness. Centrifuging of the mold in which such layer is formed at 500-600 rpm. will assist in elimination of bubbles.

Another embodiment of the invention is shown in FIG. 14, similar in construction to that of FIG. 13, but having a pair of annular disc members 28 and 29 of the hone composition of the invention bonded to the respective side faces of cast epoxy annulus 30 instead of rim 27. Such hone may be mounted on a horizontal mandrel or on a vertical spindle and reversed when one side has become worn or damaged.

The FIG. 15 embodiment is in effect a much elongated form of the FIGS. 11-13 device, and may comprise a cylindrical shell mounted on two end discs comparable to disc 23, with the hone layer 31 coated thereon. A shaft or arbor 32 passes through the central holes in such discs. A roller hone such as this may be three feet in length and a foot in diameter and may be employed to surface beneficiate metal strip and sheet.

The form illustrated in FIGS. 16 and 17 comprises a wheel 33 entirely of the hone composition and having a central arbor hole 34. It may be about one foot in diameter and a little less than one-half inch in thickness, with its outer periphery 35 being semi-circular in section on a 3/16-inch radius. It is shown in FIG. 17 clamped between large circular plates or flanges 36 and 37 with only a small radial extent of wheel 33 protruding from therebetween. As such wheel wears and is dressed to a smaller diameter, successively smaller face plates may be substituted. Such wheel is normally operated at about 300 rpm. and is employed to polish grooves and intricate shapes.

FIG. 18 of the drawing illustrates in a somewhat exaggerated diagrammatic manner how the hone surface 1, for example, may be locally depressed as it passes beneath the edge 38 of tool 9 to be sharpened. The transient indentation 39 thus made in the slightly cushioned hone surface tends to form a slightly convex slope 40 as it resiliently recovers and moves past tool edge 38 with an upwardly wiping action effective to remove any wire edge adhering thereto, and producing a slight hollow grinding effect. Such edge is thereby rendered ultra sharp in a very short period of time, and such sharpness may be maintained or quickly restored by frequent brief returns to the hone.

When inspected under very high magnification, and even under an electron microscope, it is found that a remarkably straight and even cutting edge 38 (FIG. 22) can be produced on good quality tool steels in marked contrast to the ragged edge 38a (FIG. 23) produced with even the most careful sharpening with top grade prior art hones. In addition to guarding against production of minute defects in such edges, the aforesaid striations 14, 15 and 16 also enhance the wiping or ripple action of the hone above described.

The new hones of the invention also are exceptionally useful in sharpening instruments and the like so thin or slender as to have little heat sink capacity and therefore susceptible of metallurgical damage due to localized overheating. Thus, hypodermic needles and bone marrow needles, for example, may be brought to extremely high sharpness while fully maintaining their other requisite characteristics. Likewise, quartz wafers for frequency control and silicon single crystal wafers for use in the production of micro-circuits may be honed or lapped without damage thereto. Due to the relatively high abrasive grain concentration employed and despite the extreme fineness thereof, it is possible to remove a certain amount of material from the work while nevertheless producing a very high polish. Consequently, in many cases the need for a number of sequential stages of finishing operations may be substantially reduced.

Referring now more particularly to FIGS. 19-21 of the drawing, FIG. 19, based on a photo micrograph, semi-diagrammatically illustrates a low micron furrow 41 formed in the surface 42 of a metal workpiece 43 by a small abrasive grain. Such action by the abrasive grain throws up a rough ridge or burr 44 and 45 at each side of furrow 41 as it cuts across surface 42, as shown best in section in FIG. 20. Following the action of the hone of the invention across such furrowed surface, the burrs and slivers are removed and the furrow 41 substantially smoothed and rounded to provide a condition far less susceptible to concentrations of stress, as indicated in FIG. 21.

The body of the abrasive tool of the invention is stubbornly resilient to a degree enabling it to be transiently slightly indented by engagement with the work in the manner described above, with additional increments of yielding requiring imposition of progressively greater amounts of additional force. As indicated by the Shore Hardness limitations set forth above, the effect, therefore, is not one of softness, but rather one of rapidly increasing resistance.

Novel results are obtainable employing cutting tools brought to ultimate sharpness with the hones of the invention, such as the machining of Lucite with the production of a water-clear machined surface instead of the usual haze. Tungsten carbide metal-cutting tools may be sharpened in a manner favorably affecting the efficiency and productiveness of the machine tools utilizing them and producing much improved surfaces on the work. Because of its effectiveness when operated at quite low speeds, the finishing of materials such as quartz and silicon is expedited and damage by overheating is avoided. Of course, tools to be sharpened should ordinarily first be sharpened on a fine whetstone or the like, the hone of this invention being employed only to afford the ultimate edge. A standard dressing oil compound may also be employed in conjunction with the hones in the usual manner, and the hone surface is moved in a direction away from the tool edge as indicated in FIG. 18 and not toward such edge as is common practice with prior art hones such as Arkansas Stones. It is often beneficial to dispose such edge slightly diagonally of the direction of hone travel.

Other modes of applying the principle of the invention may be employed, change being made as regards the details described, provided the features stated in any of the following claims or the equivalent of such be employed.

I claim:

1. A slightly resiliently yielding abrasive article comprising a quantity of fine discrete abrasive particles having a size of at least as fine as 700 mesh bonded together in an elastomeric resin binder, said particles being sufficiently densely concentrated in said binder to afford a Shore D Hardness of from 70 to 100 at the working face of said article.

2. The abrasive article of claim 1 wherein the working face of said article is further characterized as having a cold flow reading on the Shore D scale of from about five to fifteen points lower than the initial reading after a period of from five to ten seconds.

3. The abrasive article of claim 1 wherein said abrasive particles are at least as densely concentrated as the pack density thereof, and said resin binder substantially completely fills the minute interstices therebetween.

4. The abrasive article of claim 3 wherein said abrasive particles are more highly concentrated than the pack density thereof.

5. The article of claim 1 wherein said resin is a non-foamed polyurethane.

6. The article of claim 1 wherein said resin is an epoxy.

7. The article of claim 1 wherein said particles are at least as fine as 1200 mesh.

8. The article of claim 1 wherein said particles are at least as fine as 20 microns in diameter.

9. The article of claim 1 wherein said particles are sericite at least as fine as 4 microns in diameter.

10. The article of claim 1 in the form of a rotatable disc.

11. The article of claim 1 in the form of a rotatable wheel.

12. The article of claim 1 in the form of an endless flexible abrasive belt.

13. The article of claim 1 in the form of a rotatable disc having a multitude of fine generally radially extending striations in its working surface.

14. The article of claim 1 in the form of a rotatable wheel having a multitude of fine striations extending transversely in its outer working surface.

15. The article of claim 1 in the form of an endless flexible abrasive belt having a multitude of fine striations extending transversely of its direction of travel in its outer working surface.

16. The article of claim 1 in the form of a rotatable disc having a multitude of fine generally radially extending striations less than 0.010 inch in depth in its working surface.

17. The article of claim 1 in the form of a rotatable wheel having a multitude of fine striations less than 0.010 inch in depth extending transversely in its outer working surface.

18. The article of claim 1 in the form of an endless flexible abrasive belt having a multitude of fine striations less than 0.010 inch in depth extending transversely in its outer working surface.

19. A rotatable resiliently cushioned abrasive hone comprising a disc shape body of elastomeric resin binder material modified by the incorporation of a quantity of fine discrete abrasive particles mixed therein effective to produce a Shore D Hardness of said body of from 70 to 100, said particles being at least as fine as 700 mesh, and an annular radially outward extension of said disc in the form of an abrasive body of coarser grit size.

20. The hone of claim 19 wherein said body is further characterized as having a cold flow reading on the Shore D scale of from about five to fifteen points lower than the initial reading after a period of from five to ten seconds.

21. The method of producing a slightly resiliently cushioned abrasive article which comprises mixing a quantity of fine discrete abrasive particles having a particle size at least as fine as 700 mesh with a supply of liquid resin binder material, placing such mixture in a mold designed to form an abrasive article of a type having a working face and a non-working face, disposing such mold with such non-working face upwardly to encourage any bubbles in such mixture to rise theretoward with such abrasive particles remaining substantially undisturbed in the region of such working face and binder substantially completely filling the interstices therebetween and curing such binder to produce a composite binder-abrasive article having a Shore D Hardness of from 70 to 100 at such working face.

22. The method of claim 21 wherein the quantity of abrasive particles is at least equal to the pack density thereof, and the particle size is at least as fine as 1200 mesh.

23. The method of claim 21 wherein the resin binder is an epoxy resin binder, and the resin binder and particles are heated prior to mixing.

24. The method of claim 21 wherein the resin binder is a non-foamable polyurethane.

* * * * *